United States Patent [19]

Aonuma et al.

[11] Patent Number: 4,663,209
[45] Date of Patent: May 5, 1987

[54] MAGNETIC RECORDING MEDIUM

[75] Inventors: Masashi Aonuma; Masaaki Suzuki; Satoshi Sakakibara; Noburo Hibino; Koh Kamada, all of Kanagawa, Japan

[73] Assignee: Fuji Photo Film Co., Ltd., Kanagawa, Japan

[21] Appl. No.: 724,231

[22] Filed: Apr. 17, 1985

[30] Foreign Application Priority Data

Apr. 17, 1984 [JP] Japan .................................. 59-77148

[51] Int. Cl.$^4$ ............................................. G11B 5/704
[52] U.S. Cl. .................... 428/141; 427/128; 428/480; 428/694; 428/900
[58] Field of Search ............... 428/694, 900, 480, 141; 427/128, 131

[56] References Cited

U.S. PATENT DOCUMENTS

| | | | |
|---|---|---|---|
| 4,135,031 | 1/1979 | Akashi et al. | 427/131 |
| 4,163,823 | 8/1979 | Legras et al. | 428/900 |
| 4,246,316 | 1/1981 | Aonuma et al. | 427/131 |
| 4,304,807 | 12/1981 | Kawakami et al. | 428/900 |

Primary Examiner—Paul J. Thibodeau
Attorney, Agent, or Firm—Sughrue, Mion, Zinn, Macpeak, and Seas

[57] ABSTRACT

Magnetic recording medium is disclosed which comprises a non-magnetic support having coated thereon a magnetic layer mainly containing ferromagnetic metal particles and a binder:

(1) wherein the non-magnetic support is a polyester film having a thickness of 4 to 12 μm, (b) an F5 value in a machine direction of 16 kg/mm$^2$ or more, (c) a breaking strength in a machine direction of 25 kg/mm$^2$ or more, (d) a breaking elongation in a machine direction of 90% or less, (e) a surface roughness (Ra) of 0.01 to 0.03 μm, and (f) a fish eye (FE), which is shown in terms of height (H), of 6H or more having 0 per 100 cm$^2$, a fish eye of 5H having 2 or less per 100 cm$^2$ and a fish eye of 4H having 5 or less per 100 cm$^2$;

(2) wherein the ferromagnetic metal particles have (a) a saturation magnetization ($\sigma s$) of 110 to 160 emu/g, and (b) a specific surface area measured by the BET method of 25 to 65 m$^2$/g; and (3) wherein the magnetic layer has (a) a coercive force (Hc) of 700 Oe or more, (b) a surface roughness (Ra) of 0.015 μm or less and (c) a thickness of 1.5 to 4.5 μm.

11 Claims, No Drawings

MAGNETIC RECORDING MEDIUM

FIELD OF THE INVENTION

The present invention relates to a magnetic recording medium such as a video tape, an audio tape and a tape for a computer using ferromagnetic metal particles. More particularly, the present invention relates to a magnetic recording medium such as a digital audio tape used in both a rotary head type system and a fixed head type system.

BACKGROUND OF THE INVENTION

High density magnetic recording medium has been developed yearly and the magnetic particles have changed from iron oxide type magnetic particles to metal magnetic particles. Magnetic recording medium using ferromagnetic metal particles has been widely commericialized as a compact cassette tape used in a fixed head type system, which is the so-called "metal cassette tape" for a metal position use.

Use of ferromagnetic metal particles enable one to select coercive force from a wider range, has larger magnetic moment than the conventional magnetic particles, and can be used widely for various purposes. Therefore it is beleived that in near future ferromagnetic metal particles are to be commericialized in various fields which requires high density recording.

Extensive studies have been made to provide a 8 mm video tape to be used in a rotary head type system, which is to be put into practical use in near future. Also, a digital audio tape (hereinafter referred to "DAT") by PCM recording has been studied.

DAT has strongly been desired as a tape for recording music with high efficiency, and it is believed that DAT is to be used in a wide range from high-fidelity recording to normal audio recording.

It is necessary that the magnetic recording medium can be used both in a rotary head type system and in a fixed head type system. Hitherto, magnetic recording medium used in the rotary head type system or in the fixed head type system have been separately developed.

A rotary head type system is mainly used for video recording, for example, in a VHS system or in Beta system. Generally, a smooth support is used and the surface of a magnetic layer is subjected to smoothing treatment in order to increase the recording density and to shorten the recording wavelength, which is disclosed in Japanese Patent Application (OPI) No. 143733/82 and 16243/83 (the term "OPI" as used herein means a "published unexamined Japanese Patent application"). However, when the magnetic recording medium having good surface smoothness is run in a fixed head type sytem, running disabilities such as tape squeal or running stop readily occur. It has been proposed that runnability can be improved by providing a backing layer on the opposite surface of the support to a magnetic layer. The use of such a backing layer is very costly.

A fixed head type system is used for normal audio tape, which is the so-called a compact cassette type for audio recording. The compact cassette tape is fabricated so that the recording wavelength is about 2 $\mu$m or more and that running durability is sufficient enough to stand the use in a fixed head type system.

Therefore, the conventional tape has some problems in that the electromagnetic properties are not satisfactory in recording short wavelengths of 2 $\mu$m or less and the running durability, i.e., still characteristic, is not satisfactory.

In the present invention, a magnetic recording medium of DAT which is suitable for high density recording and can be used both in a rotary head type system and in a fixed head type system has been developed.

SUMMARY OF THE INVENTION

A first object of the present invention is to provide a magnetic recording medium prepared by using ferromagnetic metal particles, which is suitable for high density recording with a recording wavelength of about 2 $\mu$m or less and has good runnability both in a rotary head type system and in a fixed head type system.

A second object of the present invention is to provide a magnetic recording medium prepared industrially at a low cost.

DETAILED DESCRIPTION OF THE INVENTION

The above objects can be accomplished by a magnetic recording medium comprising a non-magnetic support having coated thereon a magnetic layer mainly containing ferromagnetic metal particles and a binder;

(1) wherein the non-magnetic support being is polyester film having (a) a thickness of 4 to 12 $\mu$m, (b) a F5 value in a machine direction of 16 kg/mm² or more, (c) breaking strength in a machine direction of 25 kg/mm² or more, (d) a breaking elongation in a machine direction of 90% or less, (e) a surface roughness (Ra) of 0.01 to 0.03 $\mu$m and (f) fish eyes (FE-protrusions), defined in terms of height (H), wherein there are no fish eyes of 6H, 2 or less fish eyes of 5H per 100 cm², and less than 5 fish eyes of 4H per cm², (2) wherein the ferromagnetic metal particles have (a) a saturation magnetization ($\sigma$s) of 110 to 160 emu/g, and (b) a specific surface area measured by the BET method of 25 to 65 cm²/g; and (3) wherein the magnetic layer has (a) a coercive force (Hc) of 700 Oe or more, (b) a surface roughness (Ra) of 0.015 $\mu$m or less and (c) a thickness of 1.5 to 4.5 $\mu$m.

The non-magnetic support to be used in the present invention is a polyester film having a thickness of 4 to 12 $\mu$m, preferably 4 to 10 $\mu$m. It is important for the support to have physical properties such that the F5 value (strength of a film which is elongated by 5%) of a film in a machine direction is 16 kg/mm² or more, preferably 16 to 25 kg/mm², the breaking strength (strength of a film which is elongated and cut) in a machine direction is 25 kg/mm² or more, preferably 25 to 50 kg/mm², and the breaking elongation (elongation of a film which is cut) in a machine direction is 90% or less, preferably 50 to 90%. The F5 value and breaking strength in a transverse direction of a film can be smaller than those in a machine direction, and should preferably be as high as possible.

Regarding the surface properties of the non-magnetic support, it is important that the surface roughness Ra (center line average roughness) in cut off of 0.25 m/m measured by a needle touching method (a diamond needle having a needle diameter of 2 $\mu$m) is 0.01 to 0.03 $\mu$m, preferably 0.015 to 0.025 $\mu$m and the fish eye (FE) with 6H or more is 0/100 cm², FE with 5H is 2 or less/100 cm², preferably 1 or less/100 cm², and FE with 4H is 5 or less/100 cm², preferably 4 or less/100 cm².

Fe is checked by a polarizing microscope and its height is measured by a multiple interference microscope. As a filter, IF (metal interferece filter λ=546 nm) is used and the height is shown by the number of interference bands. That is, 1H means that there is one interference band. 1H is 0.273. 5H, for example, means 5 interference bands. Therefore, the height 5H is 1.365 μm.

The surface properties of the non-magnetic support are important factors, and the Ra value has a close relation with the running properties in a rotary head type system and in a fixed head type system. FE has a close relationship with dropout. It is necessary to decrease dropout which is caused by FE in order to keep the error rate of the magnetic recording medium on the order of $10^{-4}$. Therefore, the number of FE of 4H or more is very important, and FE should be adjusted to the above described height. That is, as the surface properties have an effect on the electromagnetic properties and the running properties of the magnetic recording medium, the effect of the present invention can be attained by adjusting the Ra value, height and number of FE to the above described ranges. The surface properties of the polyester film can be the same with those on opposite surfaces thereof. If a film is a dual film, the surface properties on the opposite surfaces should be within the above described range. If the physical properties, particularly the F5 value and breaking strength in a machine direction of the film are lower than those described above, they give adverse influences on the process aptitude, e.g., slittability, resulting in the reduction of yield, whereby it costs more, and the runnability both in a fixed head type system and in a rotary head type system deteriorates. The runnability deteriorates more as the film becomes thinner.

The ferromagnetic metal particles used in the present invention have a saturation magnetization ($\sigma s$) of 110 to 160 emu/g, preferably 115 to 145 emu/g, a specific surface area measured by the BET method of 25 to 65 m$^2$/g, preferably 35 to 55 m$^2$/g and the coercive force can be optionally selected to a desired value of 700 Oe or more. Ferromagnetic metal particles can be prepared by a known method, as disclosed, for example, in Japanese Patent Application (OPI) No. 56511/77 (the term "OPI" as used herein means a "published unexamined Japanese Patent application").

The ferromagnetic metal particles used in the present invention can be those that are conventionally used, have metal content of 75 wt%, preferably 80 wt% or more, and 50 wt% or more of the metal content is Fe and at least one of metals selected from Co, Ni, Cr, Cu, Zn, Al, Mn and the like can be included, as disclosed, for example, in U.S. Pat. No. 4,246,316. Besides the metal, hydrogen, oxygen or nitrogen can be included. An average particle size in a shorter axis is 150 to 500 Å, preferably 200 to 450 Å. The average axial ratio is 3 to 200, preferably 3 to 12.

The magnetic layer of the present invention can be prepared by mixing, kneading and dispersing the ferromagnetic metal particles and binders, lubricating agents, abrasive agents, electroconductive carbon and organic solvents to prepare a magnetic coating composition, which is then coated on a non-magnetic support.

It is important for the magnetic layer of the present invention to adjust the coercive force to 700 Oe or more, preferably 1100 to 1650 Oe, the thickness to 1.5 to 4.5 μm, preferably 2.0 to 3.5 μm, and the surface roughness (Ra), (center line average roughness is cut-off of 0.25 mm, as defined in item 5 of JIS B0601) to 0.015 μm or less, preferably 0.013 to 0.006 μm.

The mixing weight ratio of ferromagnetic metal particles and binders of the present invention is 10 to 400 parts, preferably 15 to 50 parts by weight of the binders based on 100 parts by weight of ferromagnetic metal particles.

The binders used in the present invention are conventionally known thermoplastic resins, thermosetting resins, reactive type resins and the mixtures thereof.

Thermoplastic resins are those having a softening point of 150° C. or less, an average molecular weight of 10,000 to 200,000, and a degree of polymerization of about 200 to 500 such as copolymers of vinyl chloride and vinyl acetate, copolymers of vinyl chloride and vinylidene chloride, copolymers of vinyl chloride and acrylonitrile, copolymers of acrylate and acrylonitrile, copolymers of acrylate and vinylidene chloride, copolymers of acrylate and styrene, copolymers of methacrylate and acrylonitrile, copolymers of methacrylate and vinylidene chloride, copolymers of methacrylate and styrene, urethane elastomer, nylon and silicone type resins, nitrocellulose and polyamide resins, polyvinyl fluoride, copolymers of vinylidene chloride and acrylonitrile, copolymers of butadiene and acrylonitrile, polyamide resins, polyvinyl butyral, cellulose derivatives (cellulose acetate butyrate, cellulose diacetate, celllose triacetate, cellulose propionate, nitrocellulose and the like), copolymers of styrene and butadiene, polyester resins, copolymers of chlorovinyl ether and acrylate, amino resins, thermoplastic resins of various synthetic rubber type and the mixtures thereof.

Themosetting resins or reactive type resins have a molecular weight of 200,000 or less in a state of a coating composition and the molecular weight becomes infinite after the coating composition is coated and dried by the reaction of condensation or addition reaction. Of these resins, resins that do not soften or melt until they are heat-decomposed are preferred. Specific examples of the resins are phenol resin, epoxy resins, curable polyurethane resins, urea resins, melamine resins, alkyl resins, silicone resins, acryle type reactive resin, epoxy and polyamide resins, nitrocellulose and melamine resins, a mixture of high molecular weight polyester resins and isocyanate prepolymer, a mixture of copolymers of methacrylate and diisocyanate prepolymer, a mixture of polyester polyol and polyisocyanate, urea fomaldehyde resins, a mixture of a low molecular weight glycol, a high molecular weight diol and triphenyl methane triisocyanate, polyamine resins and the mixture thereof.

Examples of those resins are disclosed in U.S. Pat. No. 4,135,031.

When ferromagnetic particles and binders are mixed and dispersed, lubricants, abrasive agents, electroconductive carbon and the like can be included, if desired.

The lubricant includes fatty acids having 12 to 18 carbon atoms ($R_1COOH$; $R_1$ represents an alkyl group having 11 to 17 carbon atoms), silicone oil, fatty acid esters between a monobasic fatty acid having 12 to 16 carbon atoms and a monohydric alcohol having 3 to 12 carbon atoms, and fatty acid esters between a monobasic fatty acid having not less than 17 carbon atoms and a monohydric alcohol having such carbon atom number that the number of total carbon atoms in the ester including the carbon atoms of the fatty acid moiety is 21 to 23. These lubricants are described, e.g., in U.S. Pat. No. 4,135,016.

The electroconductive carbon can be added in an amount of 0.1 to 20 parts, preferably 0.5 to 8 parts by weight based on 100 parts by weight of ferromagnetic metal particles.

The abrasive agents are those that are conventionally used such as fused alumina, silicone carbide, chromium oxide, corundum, $TiO_z$ (z=1.0 to 1.9), artificial corundum, diamond, artificial diamond, garnet, emery (main component: corundum and magnetite) and the like. The abrasive agents used in the present invention have an average particle diameter of 0.05 to 5 μm, preferably 0.1 to 2 μm. Those abrasive agents can be added in an amount of 0.1 to 20 parts, preferably 1 to 15 parts, by weight based on 100 parts by weight of ferromagnetic metal particles. Various mixing and kneading devices are used for mixing, kneading and dispersing ferromagnetic metal particles, binders and abrasive agents. Mixing and kneading devices are a two-roll mill, a three-roll mill, a ball mill, a pebble mill, a trommel, a sand grinder, a Szegvari attriter, a high speed impeller dispersing device, a high speed stone mill, a high speed impact mill, a disperser, a kneader, a high speed mixer, a homogenizer and an ultrasonic dispersing device.

The art of mixing, kneading and dispersing is disclosed in T. C. Patton "Paint Flow and Pigment Dispersion" (1964, John Wiley & Sons.), and in U.S. Pat. Nos. 2,581,414 and 2,855,156.

The method for coating the magnetic recording layer to the support includes an air doctor coating, a blade coating, an air knife coating, a squeeze coating, a dip coating, a reverse roll coating, a transfer roll coating, a gravure coating, a kiss coating, a cast coating and a spray coating, and other coating methods can be used. The specific explanation is given in "Coating Engineering", on pages 253 to 277, published by Asakura Shoten (Mar. 20, 1971).

The organic solvents used for coating include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate, or glycol acetate monoethyl ether; glycol ethers such as ether, glycol dimethyl ether, glycol monoethyl ether or dioxane; tars (aromatic hydrocarbons) such as benzene, toluene or xylene; and chlorinated hydrocarbons such as methylene chloride, ethylene chloride, carbon tetrachloride, chloroform, ethylene chlorohydrin or dichlorobenzene.

The magnetic layer thus coated on a support is subjected to magnetic orientation, if desired, and is then dried.

An alternative current, a direct current or a mixture thereof having about 500 to 5000 Oe is applied. The drying temperature is about 50° to 120° C. and the period of time for drying the magnetic layer is about 0.5 to 10 minutes.

Surface smoothing treatment can be carried out, if desired. In the present invention, the surface roughness (Ra) of the magnetic layer can be adjusted to 0.015 μm or less, preferably 0.006 to 0.013 μm. The magnetic layer is then slit to a desired shape to prepare a magnetic recording medium of the present invention.

The present invention will be illustrated in more detail by the following non-limiting Example. In the Example, all parts are by weight.

EXAMPLE

Nickel adsorbed goethite was subjected to heat treatment at 600° to 750° C. to obtain Fe-Ni-Cr type acicular oxide, which was then reduced with hydrogen at 300° to 400° C. to prepare Fe-Ni-Cr type ferromagnetic metal particles.

The ferromagnetic metal particles were soaked in toluene, taken out of toluene, exposed to air and dried to evaporate toluene by controlling the oxygen concentration. The thus dried Fe-Ni-Cr type ferromagnetic metal particles had a saturation magnetization of $\sigma s$ 140 emu/g, coercive force (Hc) of 1500 Oe and specific surface area by BET of 51.5 m²/g. The ratio of Ni and Cr to Fe was 4.5 wt% and 3.7 wt% respectively.

The magnetic coating composition was prepared using the thus prepared ferromagnetic metal particles and the following composition.

| | |
|---|---|
| Ferromagnetic metal particles | 100 parts |
| Copolymer of vinyl chloride/vinyl acetate/vinyl alcohol (91/3/6 wt %; degree of polymerization: about 420) | 15 parts |
| Polyester polyurethane (a reaction product of ethylene adipate and 2,4-diisocyanate: molecular weight: about 130,000) | 8 parts |
| Carbon black (average particle diameter: 20 mμ) | 1 part |
| α-Al₂O₃ (average particle diameter: 0.4μ) | 3 parts |
| Methyl ethyl ketone | 150 parts |
| Cyclohexanone | 150 parts |

The above composition was put in a ball mill, mixed and kneaded and dispersed by a sand grinder for two hours to prepare a magnetic coating composition.

Further, 5 parts of a triisocyanate compound ("Coronate L", a tradename, manufactured by Nippon Polyurethane Co., Ltd.), one part of oleic acid, 1 part of myristic acid and 1 part of butyl stearate were added thereto and they were dispersed for 30 minutes with a high speed shearing force.

The thus prepared magnetic coating composition was filtered by a filter having three filtering surfaces of 5μ-1μ-1μ and was then coated on one surface of each polyester (PET) film as shown in Table 1. The film were subjected to magnetic orientation in a machine direction with a cobalt magnet of about 4,000 Gauss and with a solenoid of about 1,500 Gauss and were heated and dried at the maximum temperature of 110° C. to obtain magnetic webs.

The thus obtained manetic webs were subjected to super calendering treatment and were slit to a width of 3.78 mm to obtain magnetic tapes. The polyethylene terephthalate (PET) films of No. 1 to 10 provided with the above-described magnetic layer were identified as tapes No. 1 to 10 as shown in Table 1.

The characteristics of tapes Nos. 1 to 10 are shown in Table 2.

TABLE 1

| PET No. | Thickness of Film (μm) | Ra (μm) | F5 Value (kg/mm²) | Breaking Strength (kg/mm²) | Breaking Elongation (%) | FE per 100 cm² | | | | | | Tape No. |
|---|---|---|---|---|---|---|---|---|---|---|---|---|
| | | | | | | 2H | 3H | 4H | 5H | 6H | 7H or More | |
| 1 | 9.4 | 0.0195 | 18.9 | 43.5 | 48 | 20 | 5 | 2 | 1 | 0 | 0 | 1 |
| 2 | 5.8 | 0.0119 | 18.5 | 43.0 | 46 | 2 | 1 | 0 | 1 | 0 | 0 | 2 |

TABLE 1-continued

| PET No. | Thickness of Film (μm) | Ra (μm) | F5 Value (kg/mm²) | Breaking Strength (kg/mm²) | Breaking Elongation (%) | FE per 100 cm² 2H | 3H | 4H* | 5H | 6H | 7H or More | Tape No. |
| --- | --- | --- | --- | --- | --- | --- | --- | --- | --- | --- | --- | --- |
| 3 | 9.8 | 0.159 | 18.8 | 44.0 | 47 | 20 | 3 | 3 | 0 | 0 | 0 | 3 |
| 4 | 9.8 | 0.0238 | 18.8 | 44.0 | 47 | 20 | 8 | 4 | 1 | 0 | 0 | 4 |
| 5 | 9.8 | 0.0165 | 11.1 | 23.6 | 129 | 10 | 3 | 3 | 0 | 0 | 0 | 5 |
| 6 | 9.4 | 0.0087 | 18.9 | 43.6 | 48 | 7 | 3 | 2 | 1 | 0 | 0 | 6 |
| 7 | 9.4 | 0.0314 | 18.5 | 44.0 | 46 | 25 | 10 | 4 | 2 | 0 | 0 | 7 |
| 8 | 9.4 | 0.0190 | 18.6 | 43.2 | 49 | 10 | 6 | 3 | 2 | 1 | 2 | 8 |
| 9 | 9.4 | 0.0205 | 18.8 | 43.6 | 48 | 15 | 8 | 0 | 3 | 1 | 0 | 9 |
| 10 | 9.4 | 0.0216 | 18.8 | 43.5 | 48 | 18 | 10 | 6 | 2 | 0 | 0 | 10 |

TABLE 2

| Tape No. | Tape Hc (Oe) | Thickness of Magnetic Layer (μm) | Ra of Magnetic Layer (μm) | Output Fixed Head (dB) | Output Rotary Head (dB) | Runnability of a Fixed Head (head made of thin tape) | | | Running Durability | |
| --- | --- | --- | --- | --- | --- | --- | --- | --- | --- | --- |
| | | | | | | Dropout | Head Clogging | Running* Durability | Head Clogging | Running* Durability |
| 1 | 1420 | 3.0 | 0.0100 | 0.0 | 0.0 | A | A | A | A | A |
| 2 | 1420 | 3.0 | 0.0090 | +0.4 | +0.7 | A | A | A | A | A |
| 3 | 1420 | 3.0 | 0.0093 | +0.3 | +0.6 | A | A | A | A | A |
| 4 | 1420 | 3.0 | 0.0114 | −0.2 | −0.5 | A | A | A | A | A |
| 5 | 1420 | 3.0 | 0.0098 | 0.0 | +0.2 | A | C | C | C | C |
| 6 | 1420 | 3.0 | 0.0081 | +0.5 | +1.3 | A | A | C | A | C |
| 7 | 1420 | 3.0 | 0.0127 | −2.1 | −3.0 | A | A | A | B | A |
| 8 | 1420 | 3.0 | 0.0105 | −0.1 | −0.2 | C | C | C | C | A |
| 9 | 1420 | 3.0 | 0.0108 | 0.0 | −0.1 | C | C | A | C | A |
| 10 | 1420 | 3.0 | 0.0108 | 0.0 | 0.0 | C | A | A | A | A |

*Squeal, decreased of output level

Magnetic tapes (Tape Nos. 11 to 16) were prepared in the same manner as described above except changing the dispersion period of time for the magnetic composition, the coating condition (the thickness of the magnetic layer) and the calendering condition (Ra on the surface of the magnetic layer).

The characteristics of tapes Nos. 11 to 16 are shown in Table 3.

replayed. The replayed output level thereof was measured, assuming that the replayed output level of Tape No. 1 is to be 0.0 dB.

3. Runnability of a Fixed Head System:

The same system used for measuring the output level was used.

Dropout: When the error rate which is caused by dropout reached $1 \times 10^{-3}$ or more, the tapes were eval-

TABLE 3

| Tape No. | Tape Hc | Thickness of Magnetic Layer | Ra on Surface of Magnetic Layer | Output Fixed Head (dB) | Output Rotary Head (dB) | Runnability of Fixed Head (head made of thin tape) | | | Runnability of Rotary Head | |
| --- | --- | --- | --- | --- | --- | --- | --- | --- | --- | --- |
| | | | | | | Dropout | Head Clogging | Running* Durability | Head Clogging | Running* Durability |
| 11 | 1430 | 4.4 | 0.0116 | −0.2 | −0.3 | A | B | B | B | B |
| 12 | 1420 | 3.5 | 0.0100 | 0.0 | −0.1 | A | A | A | A | A |
| 13 | 1410 | 2.2 | 0.0104 | 0.0 | −0.1 | A | A | A | A | A |
| 14 | 1410 | 1.4 | 0.0115 | −1.0 | −1.8 | C | A | B | A | A |
| 15 | 1400 | 3.0 | 0.0155 | −3.4 | −5.2 | A | A | A | A | A |
| 15 | 1420 | 3.0 | 0.0057 | +2.5 | +4.5 | A | B | C | C | C |

*Squeal, decrease of output level

The various tape characteristics except Ra and FE indicated in Tables 1, 2 and 3 were measured or evaluated by the following methods:

1. F5 Value, Breaking Strength and Breaking Elongation:

These characteristics were evaluated by "TENSILON STM-T-100", a tradename, manufactured by Toyo Baldwin Co., Ltd. in accordance with JIS C2318.

F5 value is the strength of a film which is elongated by 5%.

2. Output:

Fixed head: Tapes run at a speed of 4.75 cm/sec., signals having a recording wavelength of about 0.8 μm were recorded using a head for a thin tape, and were replayed and the replayed output level thereof were measured. The replayed output level of Tape No. 1 was assumed to have 0.0 dB.

Rotary head: Tapes run at a relative speed of 2.9 m/sec of a Sendust head, signals having a recording wavelength of about 0.8 μm were recorded, and were uated as "no good".

Head clogging: Whether head clogging occurred as checked after tapes made 100 passes. When head clogging occurred, the tape was evaluated as "no good".

Running durability:

When output level was decreased by 6 dB or more and squeal occurred after a tape made 100 passes, the tape was evaluated as "no good".

4. Runnability of a Rotary Head System:

The same system used for measuring the output level was used.

Head clogging: Whether head clogging occurred was checked after tapes run for 30 minutes. When head clogging occurred, the tape was evaluated as "no good".

Running durability: When the output level was decreased by 6 dB or more and the tape squeal occurred after a tape was run for 120 minutes, the tape was evaluated as "no good".

The head clogging and running durability in Tables 2 and 3 were measured on two points of each sample tape and evaluated as follows.

Good on two points: A
No good on two points: C
Good on one point and no good on the other point: B In Tables 2 and 3, Tapes Nos. 1 to 4 and 11 to 13 were prepared in accordance with the Example of the present invention and Tapes Nos. 5 to 10 and 14 to 16 were prepared as comparative examples.

It is clear from the above that each tape of the present invention has stable electromagnetic properties in a short wavelength region and exhibits high output level and has better runnabilities both in a fixed head system and in a rotary head system.

While the invention has been described in detail and with reference to specific embodiments thereof, it will be apparent to one skilled in the art that various changes and modifications can be made therein without departing from the spirit and scope thereof.

What is claimed is:

1. Magnetic recording medium comprising a non-magnetic support having coated thereon a magnetic layer mainly containing ferromagnetic metal particles and a binder:
    (1) wherein the non-magnetic support is a polyester film having (a) thickness of 4 to 12 $\mu$m, (b) an F5 value in a machine direction of 16 kg/mm$^2$ or more, (c) a breaking strength in a machine direction of 25 kg/mm$^2$ or more, (d) a breaking elongation in a machine direction of 90% or less, (e) a surface roughness (Ra) of 0.01 to 0.03 $\mu$m, and (f) fish eyes (FE), defined in terms of height (H), wherein there are no fish eyes of 6H, 2 or less fish eyes of 5H per 100 cm$^2$, and less than 5 fish eyes of 4H per 100 cm$^2$;
    (2) wherein the ferromagnetic metal particles have (a) a saturation magnetization ($\sigma$s) of 110 to 160 emu/g, and (b) a specific surface area measured by the BET method of 25 to 65 m$^2$/g; and
    (3) wherein the magnetic layer has (a) a coercive force (Hc) of 700 Oe or more, (b) a surface roughness (Ra) of 0.015 m or less and (c) a thickness of 1.5 to 4.5 $\mu$m.

2. The magnetic recording medium of claim 1, wherein the non-magnetic support has a thickness of 4 to 10 $\mu$m.

3. The magnetic recording medium of claim 1, wherein the non-magnetic support has an F5 value in a machine direction of 16 to 24 kg/mm$^2$.

4. The magnetic recording medium of claim 1, wherein the non-magnetic support has a breaking strength in a machine direction of 25 to 50 kg/mm$^2$.

5. The magnetic recording medium of claim 1, wherein the non-magnetic support has a breaking elongation in a machine direction of 50 to 90%.

6. The magnetic recording medium of claim 1, wherein the non-magnetic support has a surface roughness (Ra) of 0.015 to 0.25 $\mu$m.

7. The magnetic recording medium of claim 1, wherein the ferromagnetic metal particles have a saturation magnetization of 115 to 145 emu/g.

8. The magnetic recording medium of claim 1, wherein said ferromagnetic metal particlas have a specific surface area measured by the BET method of 35 to 55 m$^2$/g.

9. The magnetic recording medium of claim 1, wherein the magnetic layer has a coercive force of 1100 to 1650 Oe.

10. The magnetic recording medium of claim 1, wherein said magnetic layer has a thickness of 2.0 to 3.5 $\mu$m.

11. The magnetic recording medium of claim 1, wherein said magnetic layer has a surface roughness (Ra) of 0.013 to 0.006 $\mu$m.

* * * * *